United States Patent
Kuwabara et al.

(10) Patent No.: US 9,229,191 B2
(45) Date of Patent: Jan. 5, 2016

(54) LENS HOLDING STRUCTURE AND METHOD OF MANUFACTURING LENS HOLDING STRUCTURE

(71) Applicant: Panasonic Corporation, Osaka (JP)

(72) Inventors: Masahiro Kuwabara, Osaka (JP); Yoshihiro Ueno, Osaka (JP); Fumio Shinano, Osaka (JP); Kiyokazu Ishiyama, Yamagata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 14/256,017

(22) Filed: Apr. 18, 2014

(65) Prior Publication Data

US 2014/0313593 A1    Oct. 23, 2014

(30) Foreign Application Priority Data

Apr. 22, 2013 (JP) .................................. 2013-089027
Mar. 14, 2014 (JP) .................................. 2014-051509

(51) Int. Cl.
*G02B 7/02* (2006.01)
*G02B 7/10* (2006.01)

(52) U.S. Cl.
CPC ................ *G02B 7/102* (2013.01); *G02B 7/025* (2013.01); *Y10T 156/10* (2015.01)

(58) Field of Classification Search
CPC ......................................................... G02B 7/04
USPC ......................................................... 359/823
See application file for complete search history.

(56) References Cited

U.S. PATENT DOCUMENTS

2010/0220402 A1   9/2010   Santo et al.
2013/0044381 A1*   2/2013   Ito ................................. 359/823

FOREIGN PATENT DOCUMENTS

JP     2010-224526 A     10/2010

* cited by examiner

*Primary Examiner* — James Jones
(74) *Attorney, Agent, or Firm* — Renner, Otto, Boisselle & Sklar, LLP

(57) ABSTRACT

The lens holding structure of the disclosure includes a lens; and a holding frame including a seat surface and holding the lens, wherein an inclination in a yaw direction and an inclination in a pitch direction of the lens in a state where the lens is brought into contact with the seat surface are substantially equal to an inclination in a yaw direction and an inclination in a pitch direction of the lens in a state where the lens is held by the holding frame, and a clearance is formed between the lens and the seat surface.

6 Claims, 12 Drawing Sheets

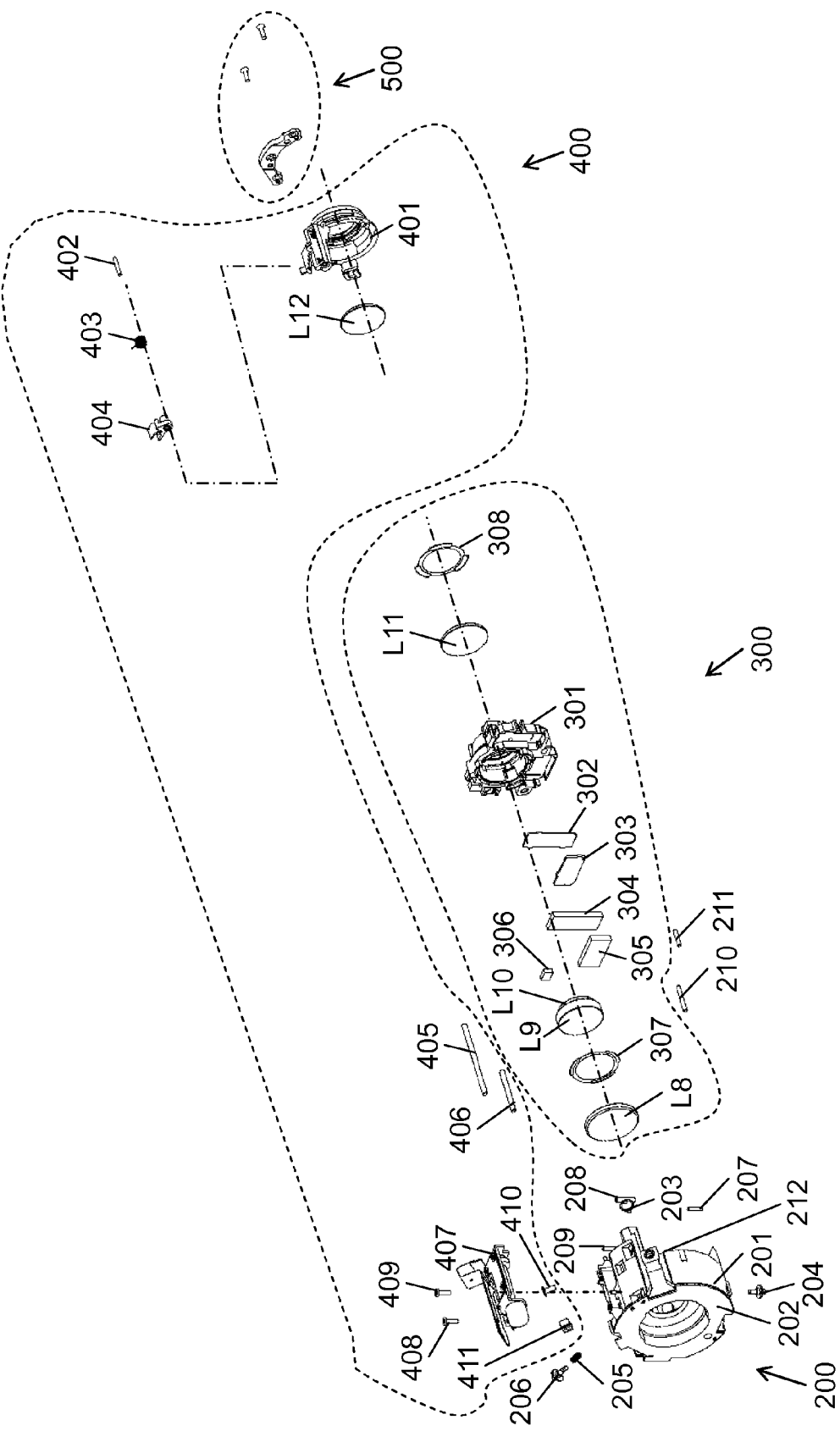

LENS HOLDING STRUCTURE AND METHOD OF MANUFACTURING LENS HOLDING STRUCTURE

TECHNICAL FIELD

The disclosure relates to a lens holding structure, and a method of manufacturing a lens holding structure.

BACKGROUND ART

Unexamined Japanese Patent Publication No. 2010-224526 discloses a lens barrel used in a digital still camera. The lens barrel disclosed in the literature is developed for miniaturizing the camera.

SUMMARY OF THE INVENTION

It is an object of this disclosure to provide a lens holding structure where adjustment of a lens can be performed with high accuracy.

The lens holding structure according to this disclosure includes: a lens; and a holding frame which has a seat surface and holds the lens, wherein an inclination in a yaw direction and an inclination in a pitch direction of the lens in a state where the lens is brought into contact with the seat surface are substantially equal to an inclination in the yaw direction and an inclination in the pitch direction of the lens in a state where the lens is held by the holding frame, and a clearance is formed between the lens and the seat surface.

A method of manufacturing a lens holding structure according to this disclosure includes the steps of: preparing a lens and a holding frame which has a seat surface and holds the lens; bringing the lens into contact with the seat surface; and moving the lens translationally in a direction away from the seat surface.

According to this disclosure, it is possible to provide a lens holding structure where the adjustment of a lens can be performed with high accuracy.

BRIEF DESCRIPTION OF THE DRAWINGS

FIG. 2A is an exploded perspective view of third-and-fourth group unit 903 according to the first embodiment.

DESCRIPTION OF EMBODIMENTS

Hereinafter, an embodiment will be described in detail by reference to drawings appropriately. However, the excessively detailed explanation may be omitted when appropriate. For example, the detailed explanation of well-known matters or the repeated explanation of the substantially same constitution may be omitted. These are taken for preventing the explanation made hereinafter from being unnecessarily redundant, thus facilitating the understanding of the disclosure by those who are skilled in the art.

Inventors of the disclosure provide the attached drawings and the explanation made hereinafter for enabling those who are skilled in the art to sufficiently understand the disclosure, and the subjects defined in CLAIMS are not intended to be restricted by the attached drawings and the explanation made hereinafter.

(First Exemplary Embodiment)

Hereinafter, the first embodiment is explained by reference to drawings.

[1. Overall Constitution of Interchangeable Lens 900]

Figure 1:
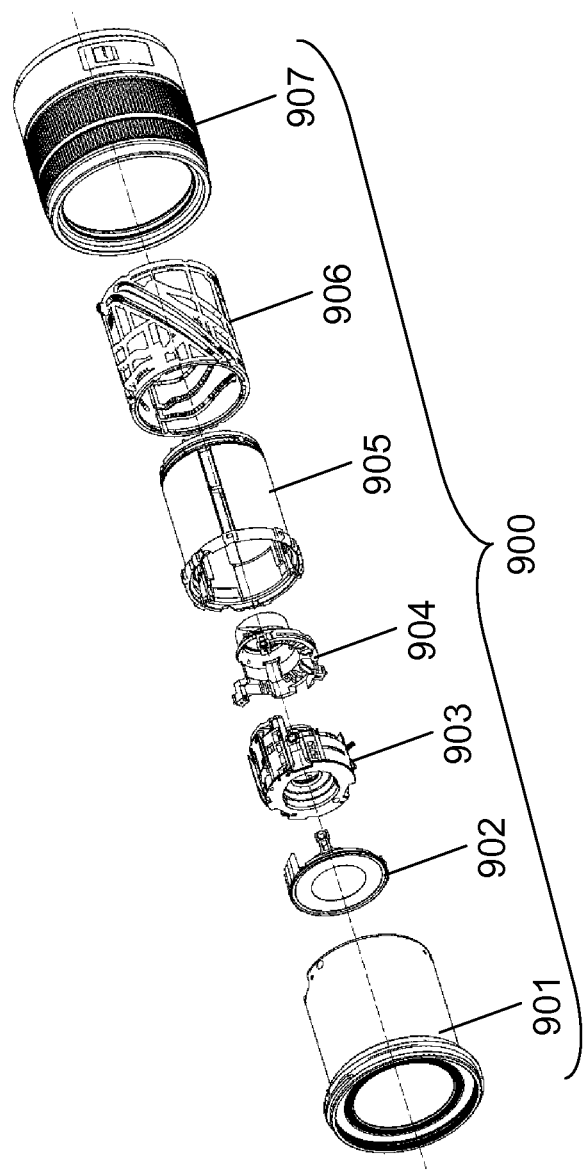
FIG. 1 is an exploded perspective view of an interchangeable lens 900 according to a first embodiment.

The overall constitution of interchangeable lens 900 is explained by reference to FIG. 1. FIG. 1 is an exploded perspective view of interchangeable lens 900.

Interchangeable lens 900 is constituted of first group unit 901, second group unit 902, third-and-fourth group unit 903, fifth group unit 904, rectilinear fixed frame 905, cam cylinder 906, and exterior unit 907.

Interchangeable lens 900 is completed by assembling the respective parts in the following order. Firstly, rectilinear fixed frame 905, fifth group unit 904, third-and-fourth group unit 903, and second group unit 902 are assembled to cam cylinder 906 in this order. Thereafter, cam cylinder 906 to which the respective parts are assembled is assembled to first group unit 901. Lastly, first group unit 901 to which cam cylinder 906 is assembled is assembled to exterior unit 907. Interchangeable lens 900 is completed by assembling the respective parts in this order.

Interchangeable lens 900 is configured such that, when a zoom ring mounted on exterior unit 907 is rotated, cam cylinder 906 is rotated along with the rotation of the zoom ring. Interchangeable lens 900 is also configured such that, when cam cylinder 906 is rotated, first group unit 901, second group unit 902, third-and-fourth group unit 903, and fifth group unit 904 move in an optical axis direction. The respective units include cam followers which are engaged with cam grooves formed on cam cylinder 906.

Further, the respective units include regulating protrusions which are engaged with restricting grooves formed on rectilinear fixed frame 905. With this constitution, the respective units are configured to be movable in the optical axis direction relative to rectilinear fixed frame 905 and cam cylinder 906.

[2. Parts Forming Third-and-Fourth Group Unit 903]

Figure 2B:
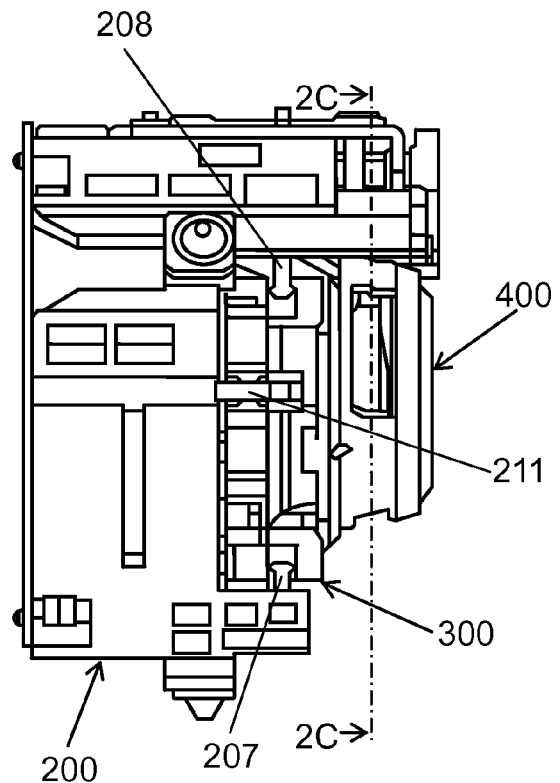
FIG. 2B is a side view of the third-and-fourth group unit 903 according to the first embodiment.
Figure 2C:
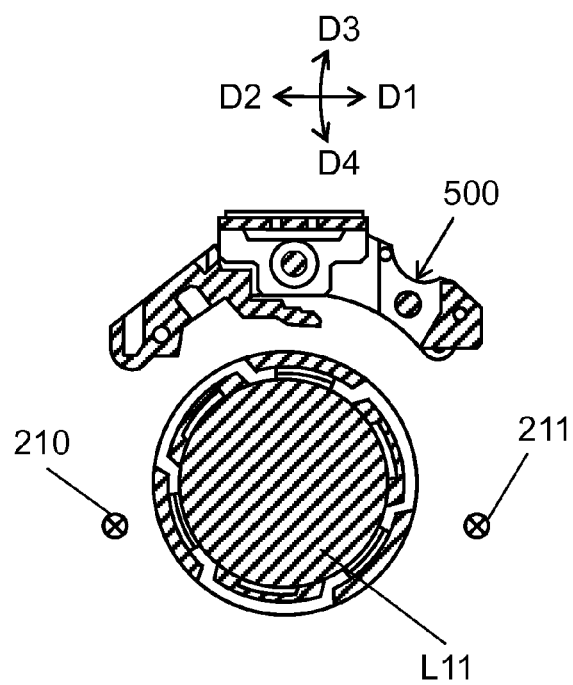
FIG. 2C is a cross-sectional view taken along line 2C-2C in FIG. 2B.

Next, parts which constitute third-and-fourth group unit 903 are explained by reference to FIG. 2A to FIG. 2C. FIG. 2A is an exploded perspective view of third-and-fourth group unit 903, FIG. 2B is a side view of third-and-fourth group unit 903, and FIG. 2C is a cross-sectional view taken along line 2C-2C in FIG. 2B.

As shown in FIG. 2A, third-and-fourth group unit 903 is constituted of diaphragm unit 200, third group unit 300, fourth group unit 400, and shaft holding portion 500.

Diaphragm unit 200 is constituted of diaphragm base frame 201, diaphragm cover 202, cam pins 203 and 204, cam pin spring 205, backlash adjusting cam pin 206, slide shafts 207, 208, and 209, movement restricting pin 210, rotary shaft 211, and restricting projection 212.

When cam cylinder 906 shown in FIG. 1 is rotated, the rotation of restricting projections 212 (one restricting member 212 shown in the drawing but two other restricting projections 212 not shown in the drawing) is restricted by rectilinear fixed frame 905 shown in FIG. 1. Further, when cam cylinder 906 is rotated, cam pins 203 and 204 and backlash adjusting cam pin 206 move along the cam grooves formed on cam cylinder 906. With such an operation, diaphragm unit 200 moves in the optical axis direction. Slide shafts 207, 208, and 209, movement restricting pin 210, and rotary shaft 211 are used for realizing the blur correction performed by third group unit 300. The detailed explanation of the blur correction is made later.

Third group unit 300 is constituted of third group frame 301, yokes 302, and 303, magnets 304 and 305, position-detecting-sensor-use magnet 306, light blocking sheets 307 and 308, and lenses L8, L9, L10, and L11.

Third group unit 300 is movable in a plane perpendicular to an optical axis of interchangeable lens 900 due to an interaction between a coil not shown in the drawing which is mounted in diaphragm unit 200 and magnets 304 and 305. That is, lenses L8 to L11 realize a blur correcting function in the lenses.

To be more specific, as shown in FIG. 2B, the movement of third group unit 300 in the optical axis direction of interchangeable lens 900 is restricted by slide shafts 207 and 208 and slide shaft 209 not shown in the drawing. As shown in FIG. 2C, third group unit 300 moves in a plane perpendicular to the optical axis of interchangeable lens 900 using rotary shaft 211 as an axis. Movement restricting pin 210 is inserted into a hole formed in third group unit 300. Accordingly, a movable range of third group unit 300 within the plane perpendicular to the optical axis of interchangeable lens 900 is restricted by a size of the hole formed in third group unit 300. With this constitution, third group unit 300 is movable within a restricted range in a plane perpendicular to the optical axis of interchangeable lens 900. To be more specific, third group unit 300 can perform the translational movement in a D1-D2 direction and can perform the rotational movement in a D3-D4 direction with reference to rotary shaft 211.

As shown in FIG. 2A, lens L8 is used for the optical adjustment of whole third group unit 300 as an aligning lens. That is, it is possible to impart a higher degree of optical performance to third group unit 300 with the use of lens L8. In this embodiment, whole third group unit 300 including four lenses is used for the blur correction. Accordingly, the blur correction performance of whole interchangeable lens 900 is relatively high.

Third group unit 300 holds four lenses L8 to L11. Third group frame 301 is formed in a shape projecting toward an image surface side in order to hold four lenses L8 to L11.

Fourth group unit 400 is constituted of fourth group frame 401, focus rack pin 402, focus rack spring 403, focus rack 404, shafts 405 and 406, focus motor 407, screws 408 and 409, 410, photo interrupter 411, and lens L12.

Focus motor 407 is fixed to diaphragm unit 200 using screws 408, 409, and 410. Shafts 405 and 406 are press-fitted into holes not shown in the drawing which are formed in diaphragm unit 200. Fourth group frame 401 of fourth group unit 400 is supported by shafts 405 and 406 in a movable manner in the optical axis direction. The movement of fourth group frame 401 in a plane perpendicular to the optical axis of interchangeable lens 900 is restricted by shafts 405 and 406. Fourth group frame 401 is moved in the optical axis direction of interchangeable lens 900 by a drive force generated by focus motor 407.

[3. Specific Constitution of Third-and-Fourth Group Unit 903]

Figure 3A:
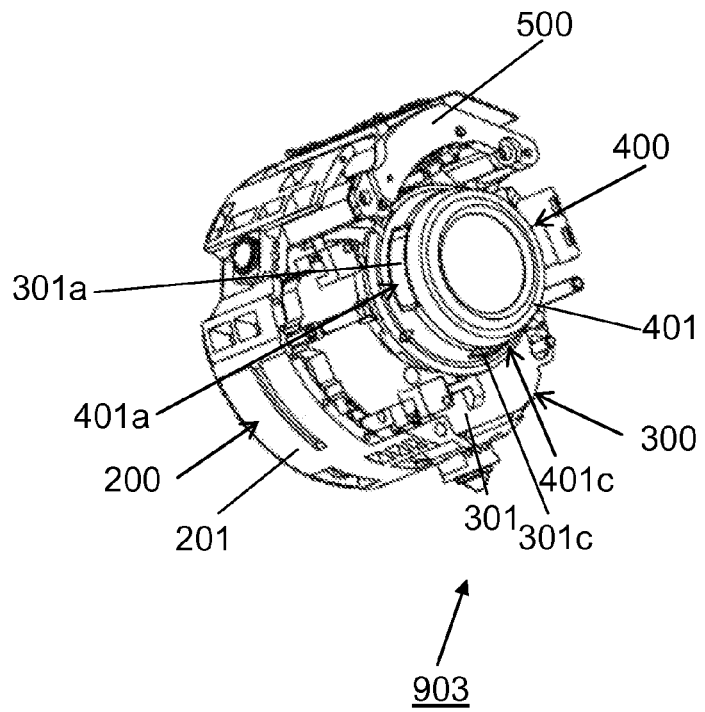
FIG. 3A is a perspective view of third-and-fourth group unit 903 according to the exemplary embodiment 1.

Next, the specific constitution of third-and-fourth group unit 903 is explained by reference to FIG. 3A to FIG. 5. FIG. 3A is a perspective view of third-and-fourth group unit 903 as viewed from an image surface side, FIG. 3B is a plan view of third-and-fourth group unit 903 as viewed from the image surface side, FIG. 4 is a perspective view for explaining third group unit 300, and FIG. 5 is a perspective view for explaining fourth group unit 400.

Figure 3B:
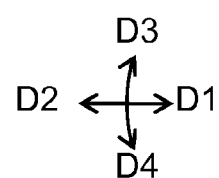
FIG. 3B is a plan view of third-and-fourth group unit 903 according to the exemplary embodiment 1.
Figure 3B:
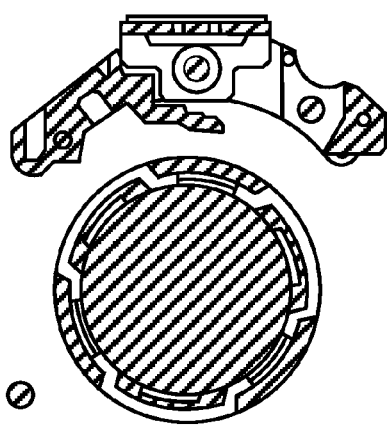

As shown in FIG. 3A and 3B, third-and-fourth group unit 903 includes diaphragm unit 200, third group unit 300, fourth group unit 400, and shaft holding portion 500. Moreover, in third-and-fourth group unit 903, adhesive reservoir 301a of third group unit 300 and through hole 401a of fourth group unit 400 are disposed at positions corresponding to each other. Adhesive reservoir 301b of third group unit 300 and through hole 401b of fourth group unit 400 are disposed at positions corresponding to each other. Adhesive reservoir 301c of third group unit 300 and through hole 401c of fourth group unit 400 are disposed at positions corresponding to each other.

Figure 4:
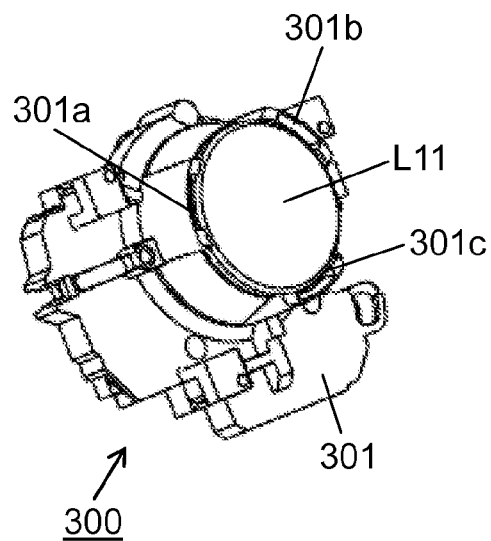
FIG. 4 is a perspective view of third group unit 300 according to the exemplary embodiment 1.

As shown in FIG. 4, third group unit 300 is constituted by assembling respective parts onto third group frame 301. Third group frame 301 includes adhesive reservoirs 301a, 301b, and 301c. Adhesive reservoirs 301a, 301b, 301c are disposed at positions projecting in the radial direction of lens L11. Indentations are formed between adhesive reservoirs 301a, 301b, and 301c and lens L11. By placing lens L11 in adhesive reservoirs 301a, 301b, and 301c and by injecting an adhesive into adhesive reservoirs 301a, 301b, and 301c, lens L11 is held by third group frame 301. Since lens L11 is fixed to third group frame 301 using an adhesive material, compared to a case where lens L11 is fixed by caulking, the optical performance of lens L11 can be maintained at a higher level. Further, while ensuring adhesive reservoirs 301a, 301b, and 301c, it is possible to prevent portions of third group frame 301 other than adhesive reservoirs 301a, 301b, and 301c from projecting toward an image surface side.

Figure 5:
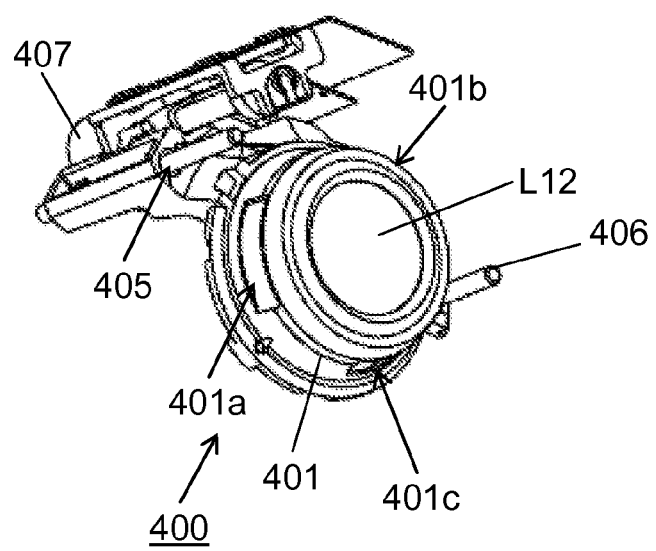
FIG. 5 is a perspective view of fourth group unit 400 according to the exemplary embodiment 1.

As shown in FIG. 5, fourth group unit 400 is constituted by assembling respective parts onto fourth group frame 401. Fourth group frame 401 includes through holes 401a, 401b, and 401c. As described above, through holes 401a, 401b, and 401c are disposed at positions each corresponding to adhesive reservoir 301a, 301b, and 301c in a state where fourth group unit 400 is assembled to third group unit 300. In this embodiment, third group unit 300 is movable in a plane perpendicular to an optical axis of interchangeable lens 900. Accordingly, sizes of respective through holes 401a, 401b, and 401c are adjusted such that a movable range of third group unit 300 is not restricted by through holes 401a, 401b, and 401c.

Lens L12 is fixed to fourth group frame 401 using an adhesive material. Shafts 405 and 406 are inserted into fourth group frame 401.

Fourth group frame 401 is movable along shafts 405 and 406. Focus motor 407 is mounted on fourth group frame 401. Fourth group unit 400 is movable in the optical axis direction of interchangeable lens 900 due to power obtained from focus motor 407.

[4. Specific Constitution of Third Group Frame 301]

Figure 6A:
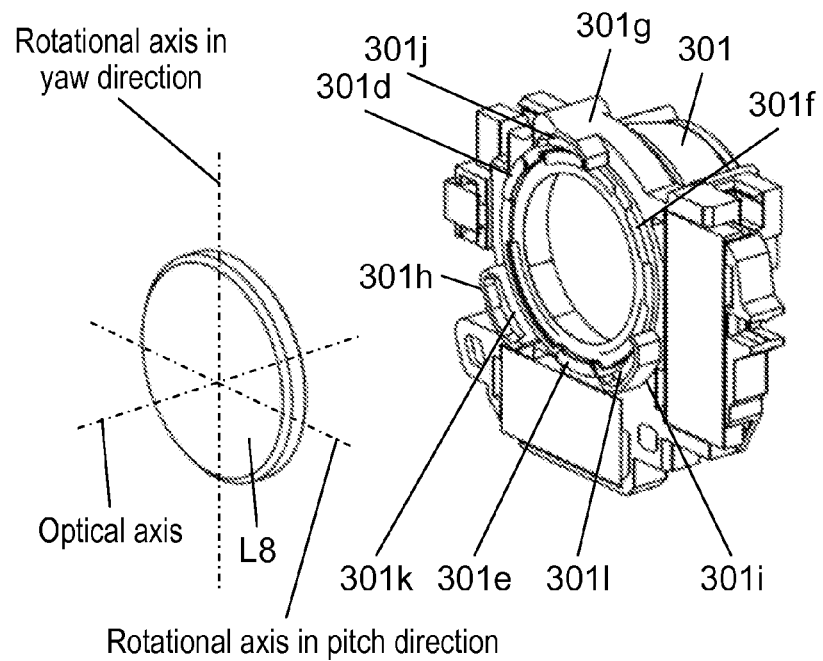
FIG. 6A is a perspective view of third group frame 301 and lens L8 as viewed from an object-to-be-imaged side.

The specific constitution of third group frame 301 is explained by reference to FIG. 6A and FIG. 6B. FIG. 6A is a perspective view of third group frame 301 and lens L8 as viewed from an object-to-be-imaged side, and FIG. 6B is a cross-sectional view of third group frame 301 to which lenses L8 to L11 are assembled.

Figure 6B:
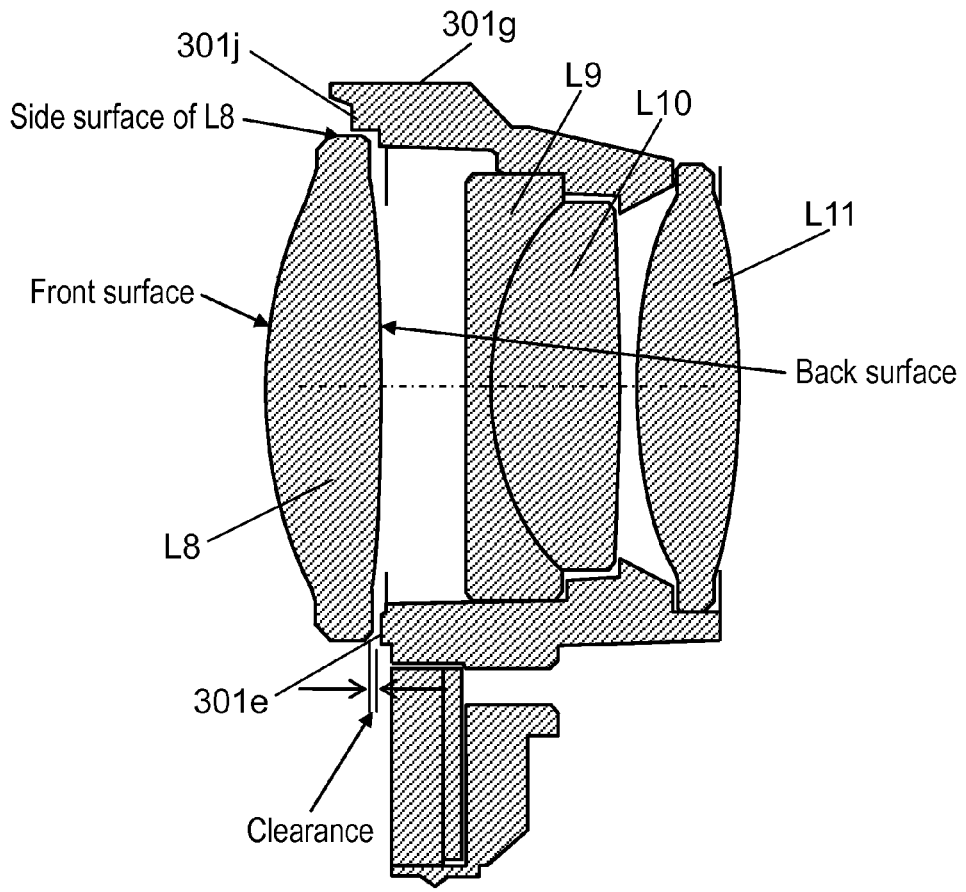
FIG. 6B is a cross-sectional view of third group frame 301 to which lenses L8 to L11 are assembled.

As shown in FIG. 6B, third group frame 301 holds lenses L8 to L11. Interchangeable lens 900 is designed optically so as to enhance the sensitivity of the lenses in third group frame 301. For this end, third group frame 301 is configured such that the adjustment of inclination of the lens or the centering of the lens can be performed. In this exemplary embodiment, lens L8 is adjusted with respect to a position on a rotational axis in the yaw direction, a position on a rotational axis in the pitch direction, and a position on an optical axis of interchangeable lens 900. Lens L8 is also adjusted with respect to an inclination in a yaw direction and an inclination in a pitch direction. That is, lens L8 is fixed to third group frame 301 by adhesion after lens L8 is adjusted with respect to five axis directions. Third group frame 301, however, may not be always limited to such a constitution. For example, lens L8 may be adjusted also with respect to the inclination around the optical axis.

As shown in FIG. 6A, third group frame 301 includes adhesive reservoirs 301g, 301h, and 301i. Adhesive reservoirs 301g, 301h, and 301i are disposed at positions projecting in the radial direction of lens L8 in a state where lens L8 is assembled to third group frame 301. Indentations are formed between adhesive reservoirs 301g, 301h, and 301i and lens L8 in a state where lens L8 is assembled to third group frame 301. Lens L8 is fixed to third group frame 301 by adhesion by injecting an adhesive into the indentations formed between adhesive reservoirs 301g, 301h, and 301i and lens L8. To be more specific, a side surface of lens L8 and adhesive reservoirs 301g, 301h, and 301i are adhered to each other by means of an adhesive.

Further, adhesive receiving surfaces 301j, 301k, and 301l which respectively form bottoms of the indentations formed between adhesive reservoirs 301g, 301h, and 301i and lens L8 are disposed at positions within a range of the side surface of lens L8 when lens L8 is assembled to third group frame 301. In other words, adhesive receiving surfaces 301j, 301k, and 301l are disposed at positions on a side closer to a front surface than a back surface of lens L8 and within the range of the side surface of lens L8. Due to such a constitution, the possibility that an adhesive will move around to a back surface side of lens L8 is reduced. When an adhesive moves around to the back surface side of lens L8, there is a possibility that lens L8 is inclined. In other words, when an adhesive moves around to the back surface side of lens L8, there is a possibility that lens L8 causes a tilt error.

Third group frame 301 also includes seat surfaces 301d, 301e, and 301f. In this exemplary embodiment, by bringing lens L8 into contact with seat surfaces 301d, 301e, and 301f one time, the inclination of lens L8 in the yaw direction and the inclination of lens L8 in a pitch direction can be adjusted. In other words, the adjustment of lens L8 in the tilting direction is performed with respect to two axes. The specific adjustment method is described later. Positions where adhesive reservoirs 301g, 301h, and 301i are disposed and positions where seat surfaces 301d, 301e, and 301f are disposed are set different from each other in the circumferential direction of an optical axis of interchangeable lens 900. In other words, adhesive reservoirs 301g, 301h, and 301i and seat surfaces 301d, 301e, and 301f are displaced from each other in phase in the circumferential direction of an optical axis of interchangeable lens 900. Due to such a constitution, such a possibility can be reduced that an adhesive which is injected into adhesive reservoirs 301g, 301h, and 301i moves around to seat surfaces 301d, 301e, and 301f so that lens L8 is inclined. In other words, a possibility that lens L8 will cause a tilt error can be deceased.

[5. Method of Fixing Lens L8]

Figure 7:
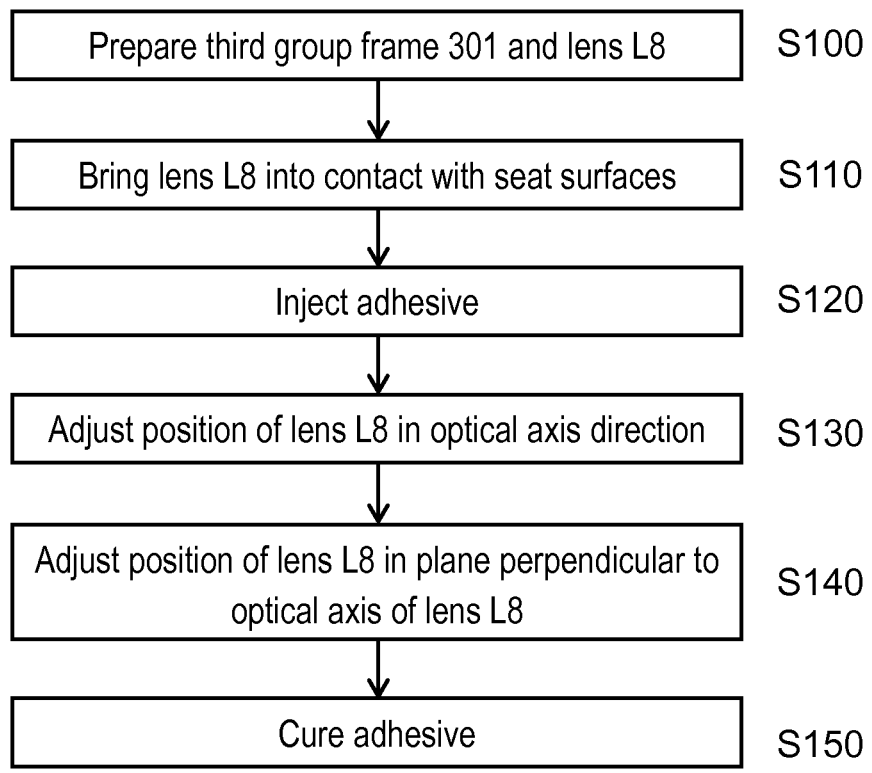
FIG. 7 is a flowchart showing the flow of steps in fixing lens L8 to third group frame 301 by adhesion.
Figure 8:
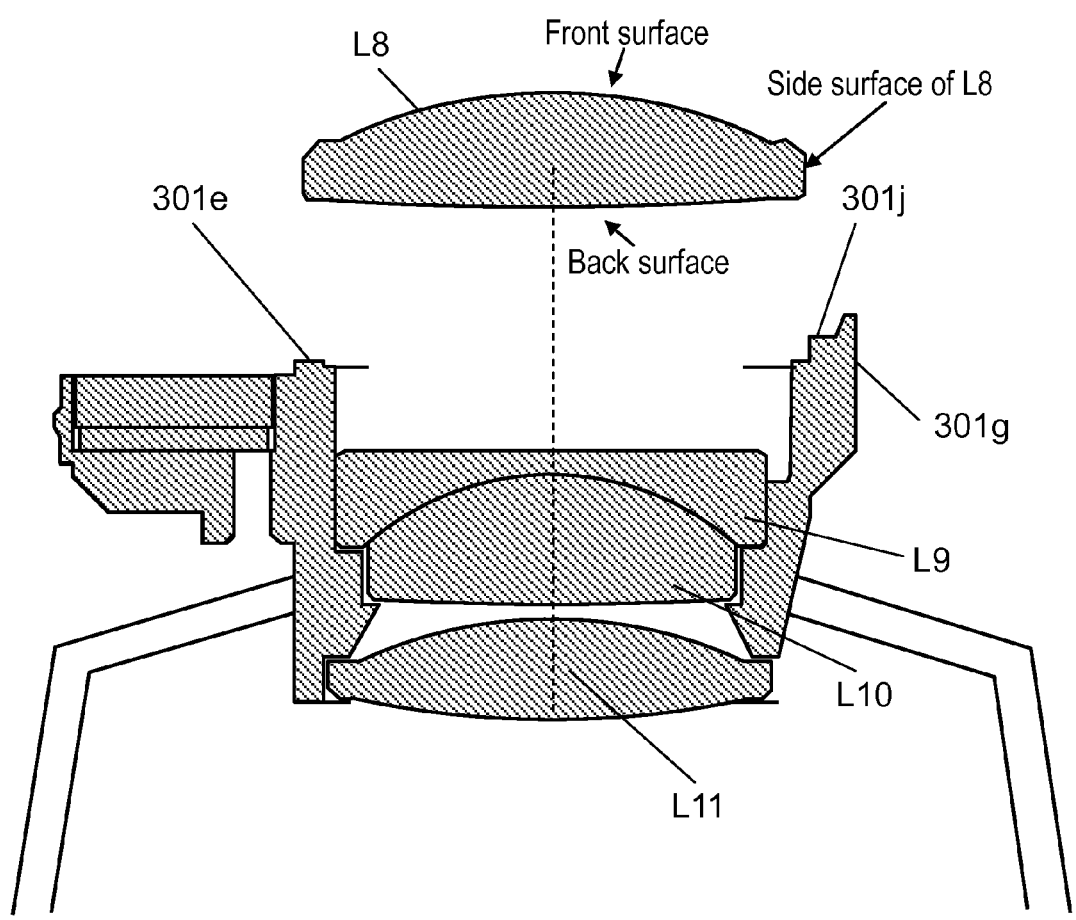
FIG. 8 is a schematic view showing a state where third group frame 301 and lens L8 are prepared.
Figure 9:
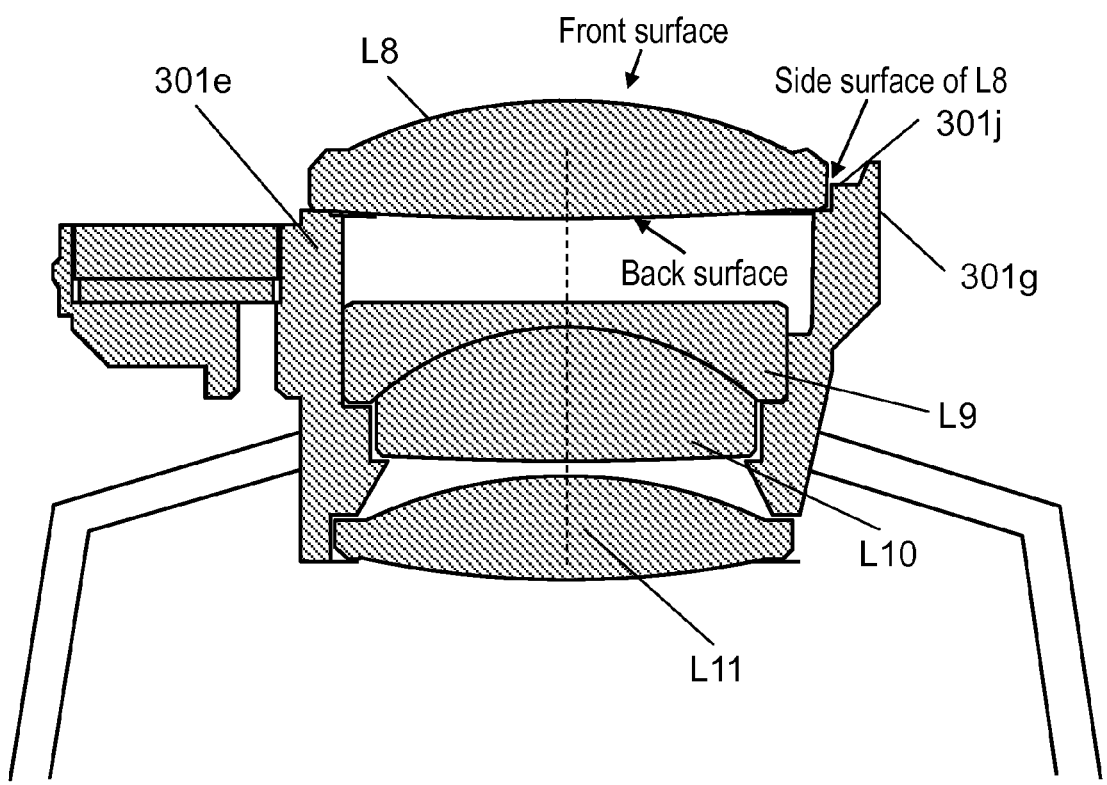
FIG. 9 is a schematic view showing a state where lens L8 is brought into contact with third group frame 301.
Figure 10:
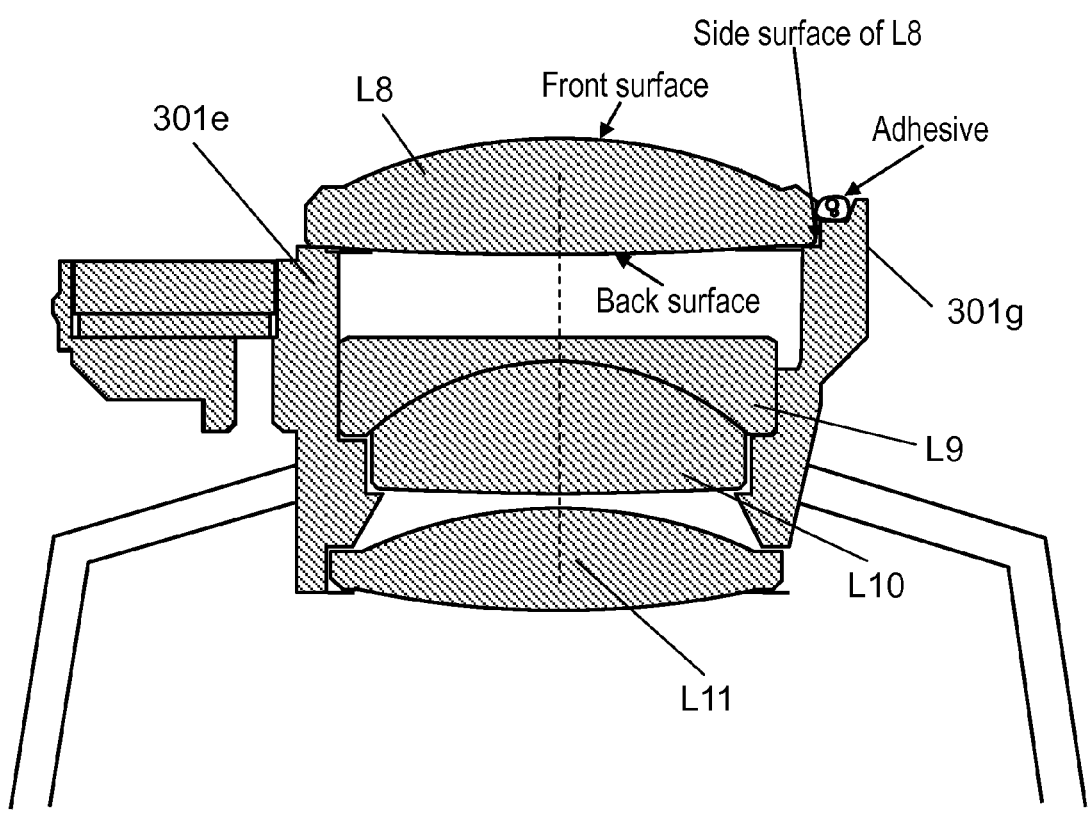
FIG. 10 is a schematic view showing a state where an adhesive is injected into adhesive reservoir 301g in a state where lens L8 is brought into contact with third group frame 301.
Figure 11:
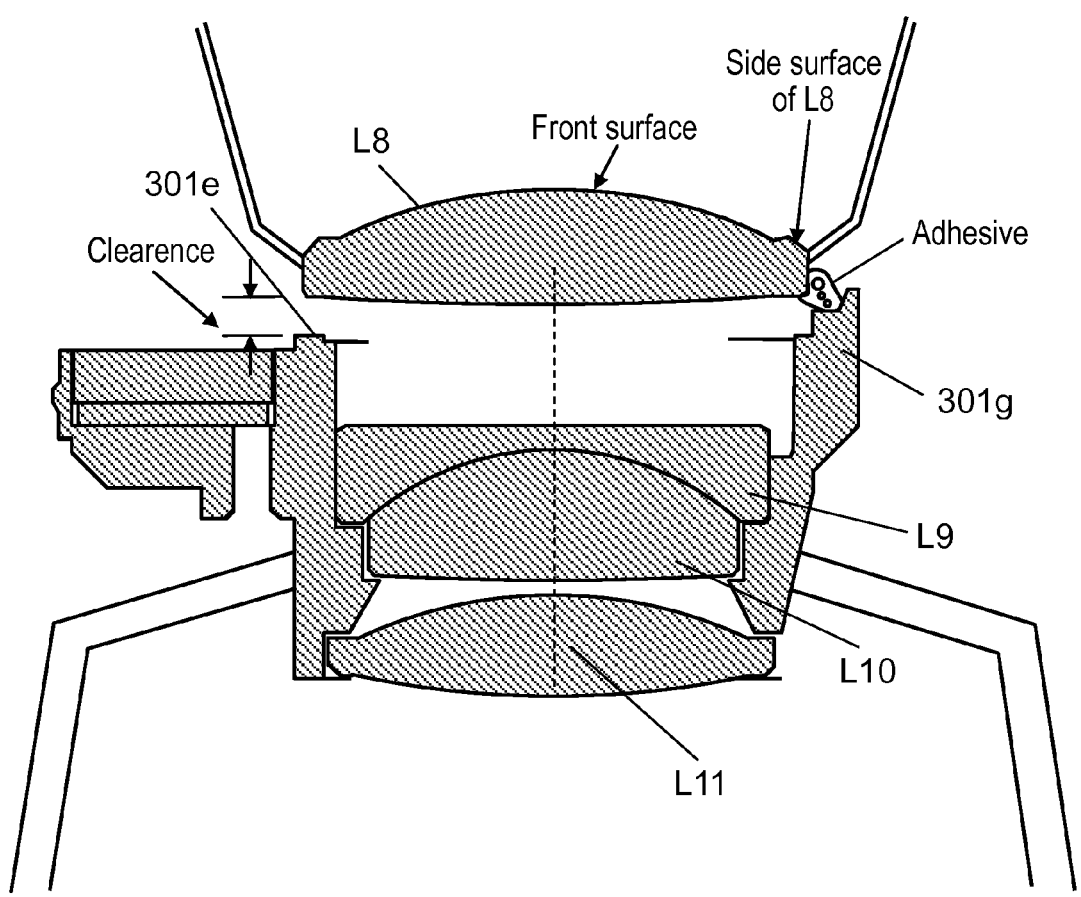
FIG. 11 is a schematic view showing a state where a position of lens L8 in the optical axis direction is adjusted in a state where an adhesive is injected into adhesive reservoir 301g.
Figure 12:
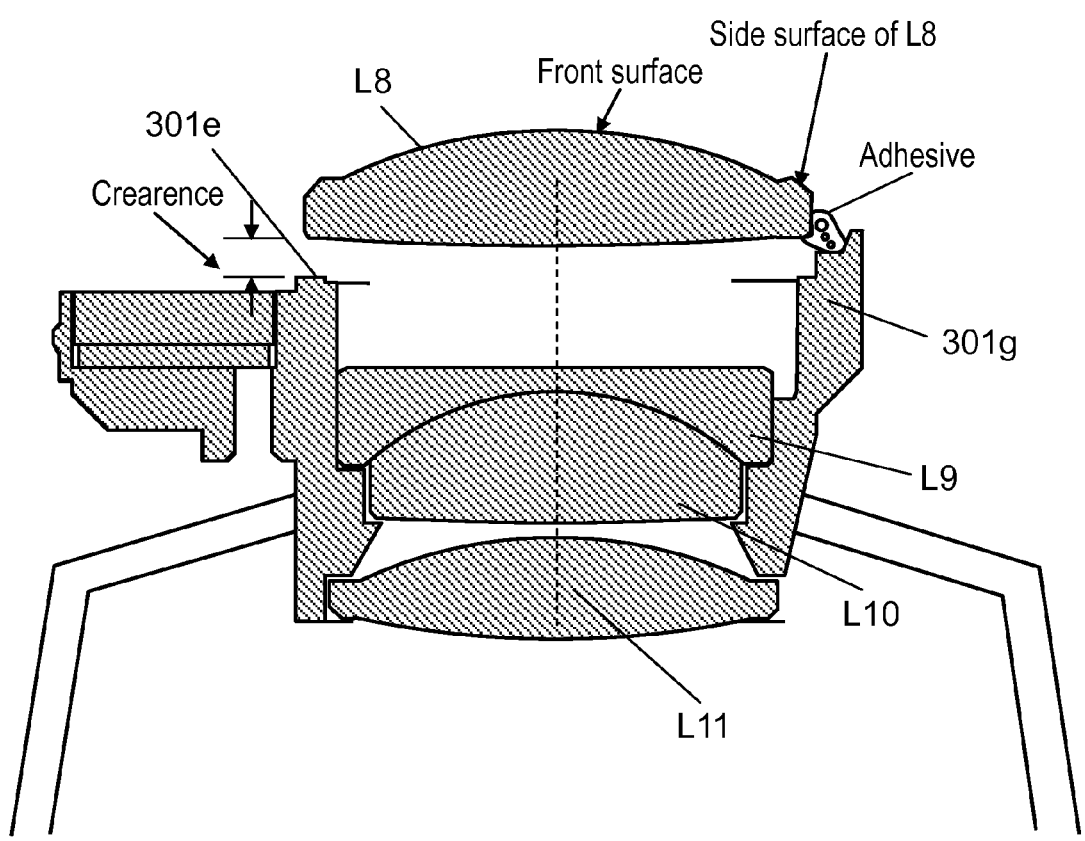
FIG. 12 is a schematic view showing a state where the adhesive is cured after the position of lens L8 in the optical axis direction is adjusted.

A method of fixing lens L8 to third group frame 301 by adhesion is explained by reference to FIG. 7 to FIG. 12. FIG. 7 is a flowchart showing the flow of steps of fixing lens L8 to third group frame 301 by adhesion. FIG. 8 is a schematic view showing a state where third group frame 301 to which lens L9 to L11 are assembled and lens L8 are prepared. FIG. 9 is a schematic view showing a state where lens L8 is brought into contact with third group frame 301 to which lens L9 to L11 are assembled. FIG. 10 is a schematic view showing a state where an adhesive is injected into adhesive reservoir 301g in a state where lens L8 is brought into contact with third group frame 301. FIG. 11 is a schematic view showing a state where a position of lens L8 in the optical axis direction is adjusted in a state where an adhesive is injected into adhesive reservoir 301g. FIG. 12 is a schematic view showing a state where the adhesive is cured after the position of lens L8 in the optical axis direction is adjusted.

Firstly, lens L8 and third group frame 301 to which lens L9 to L11 are assembled are prepared (S100). The state described in step S100 is the state shown in FIG. 8. That is, third group frame 301 to which lens L9 to L11 are assembled is disposed in a state where seat surface 301d, seat surface 301e, and seat surface 301f face upward. Further, lens L8 is prepared above third group frame 301.

When the preparation in step S100 is finished, lens L8 is brought into contact with seat surfaces 301d, 301e, and 301f (S110). The state described in step S110 is the state shown in FIG. 9. That is, by bringing lens L8 into contact with seat surfaces 301d, 301e, and 301f, the inclination of lens L8 in the yaw direction and the inclination of lens L8 in the pitch direction are adjusted. In other words, the tilting direction of lens L8 is adjusted with respect to two axes.

When the inclination adjustment in step S110 is finished, an adhesive is injected into adhesive reservoirs 301g, 301h, and 301i (S120). The state described in step S120 is the state shown in FIG. 10. That is, adhesive reservoirs 301g, 301h, and 301i and the side surface of lens L8 are adhered to each other by the adhesive.

When the injection of the adhesive in step S120 is finished, a lens adjustor moves lens L8 translationally in the optical axis direction (S130). Due to such movement, the position of interchangeable lens 900 on an optical axis can be adjusted. The state described in step S130 is the state shown in FIG. 11. The inclination in the yaw direction and the inclination in the pitch direction of lens L8 in a state where lens L8 is brought into contact with seat surfaces 301d, 301e, and 301f become substantially equal to the inclination in the yaw direction and the inclination in the pitch direction of lens L8 shown in step S130. Further, lens L8 is moved translationally in the optical axis direction and hence, clearances are formed between lens L8 and seat surfaces 301d, 301e, and 301f.

When the adjustment of the position of lens L8 on an optical axis in step S130 is finished, the lens adjustor moves lens L8 in a plane perpendicular to an optical axis (S140). Due to such movement, the position of lens L8 in the plane perpendicular to the optical axis is determined.

When the adjustment of the position of lens L8 in the plane perpendicular to the optical axis in step S140 is finished, the adhesive is cured by the radiation of ultraviolet rays (S150). The state described in step S150 is the state shown in FIG. 12. Also in this state, in the same manner as the state shown in step S130, the inclination of a rotational axis in the yaw direction and the inclination of a rotational axis in the pitch direction of lens L8 in a state where lens L8 is brought into contact with seat surfaces 301d, 301e, and 301f become substantially equal to the inclination of a rotational axis in the yaw direction and the inclination of a rotational axis in the pitch direction of lens L8 described in step S140. Further, clearances are formed between lens L8 and seat surfaces 301d, 301e, and 301f.

[6. Advantageous Effects and the Like]

As described above, third group unit 300 according to this exemplary embodiment includes lens L8 and third group frame 301. Third group frame 301 includes seat surfaces 301d, 301e, and 301f and holds lens L8.

Further, the inclination of a rotational axis in the yaw direction and the inclination of a rotational axis in the pitch direction of lens L8 in a state where lens L8 is brought into contact with seat surfaces 301d, 301e, and 301f become substantially equal to the inclination of a rotational axis in the yaw direction and the inclination of a rotational axis in the pitch direction of lens L8 in a state where lens L8 is held by third group frame 301. Further, clearances are formed between lens L8 and seat surfaces 301d, 301e, and 301f.

Due to such a constitution, third group frame 301 can adjust the inclination of lens L8 with high accuracy.

Third group frame 301 according to this exemplary embodiment further includes adhesive reservoirs 301g, 301h, and 301i which are formed at positions projecting relative to lens L8 in the radial direction of lens L8. The indentations are formed between lens L8 and adhesive reservoirs 301g, 301h, and 301i. Third group frame 301 holds lens L8 by injecting an adhesive into adhesive reservoirs 301g, 301h, and 301i.

Due to such a constitution, third group frame 301 enables the final positioning with high accuracy until an adhesive is cured at the time of adjusting the position of lens L8.

Adhesive reservoirs 301g, 301h, and 301i formed on third group frame 301 according to this exemplary embodiment respectively include seat surfaces 301d, 301e, and 301f. Seat surfaces 301d, 301e, and 301f are formed within a range of the side surface of lens L8 in the direction parallel to an optical axis of lens L8.

Due to such a constitution, third group frame 301 can reduce a possibility that an adhesive will move around to the back surface of lens L8.

Third group frame 301 according to this exemplary embodiment includes at least seat surfaces 301d, 301e, and 301f and at least adhesive reservoirs 301g, 301h, and 301i. Seat surfaces 301d, 301e, and 301f and adhesive reservoirs 301g, 301h, and 301i are disposed at positions different from each other in the circumferential direction of an optical axis of lens L8.

Due to such a constitution, such a possibility can be reduced that an adhesive injected into adhesive reservoirs 301g, 301h, and 301i will flow into areas below seat surfaces 301d, 301e, and 301f.

In the method of manufacturing third group unit 300 according to this exemplary embodiment, lens L8 and third group frame 301 are prepared. Third group frame 301 includes seat surfaces 301d, 301e, and 301f. Third group frame 301 holds lens L8. Lens L8 is brought into contact with seat surfaces 301d, 301e, and 301f. Further, lens L8 is moved translationally in the direction away from seat surfaces 301d, 301e, and 301f.

Due to such a constitution, in the method of manufacturing third group unit 300, the inclination in the yaw direction and the inclination in the pitch direction of lens L8 and the position of lens L8 on an optical axis in third group frame 301 can be adjusted with relatively high accuracy.

In the method of manufacturing third group unit 300 according to this exemplary embodiment, when lens L8 is moved translationally in the direction away from seat surfaces 301d, 301e, and 301f, the inclination in the yaw direction and the inclination in the pitch direction of lens L8 are not substantially changed.

Accordingly, in the method of manufacturing third group unit 300, the inclination in the yaw direction and the inclination in the pitch direction of lens L8 and the position of lens L8 on an optical axis in third group frame 301 can be adjusted with relatively high accuracy.

The embodiment has been explained heretofore as an example of the technique according to the disclosure. For this purpose, the attached drawings and the detailed explanation are provided.

Accordingly, the constitutional elements described in the attached drawings and the detailed description may include not only the constitutional elements necessary for overcoming the problems but also constitutional elements which are unnecessary for overcoming the problems in order to exemplify the aforementioned techniques. Therefore, such unnecessary constitutional elements should not be immediately determined to be necessary for the reason that these unnecessary constitutional elements are described in the attached drawings and the detailed description.

Further, the aforementioned embodiment is merely for exemplifying the techniques according to the disclosure and, therefore, various changes, replacements, additions, omissions and the like can be made thereto within the scope of the claims and scopes equivalent thereto.

The invention claimed is:

1. A lens holding structure comprising:
   a lens; and
   a holding frame including a seat surface and holding the lens,
   wherein an inclination in a yaw direction and an inclination in a pitch direction of the lens in a state where the lens is brought into contact with the seat surface are substantially equal to an inclination in the yaw direction and an inclination in the pitch direction of the lens in a state where the lens is held by the holding frame, and
   a clearance is formed between the lens and the seat surface which is not in contact with the lens.

2. The lens holding structure according to claim 1, wherein the holding frame further includes an adhesive reservoir which is disposed at a position projecting relative to the lens in a radial direction of the lens with an indentation formed between the adhesive reservoir and the lens, and holds the lens by injecting an adhesive into the adhesive reservoir.

3. The lens holding structure according to claim 2, wherein the adhesive reservoir includes an adhesive receiving surface which forms a bottom of the indentation, and
   the adhesive receiving surface is formed within a range of a side surface of the lens in a direction parallel to an optical axis of the lens.

4. The lens holding structure according to claim 2, wherein the holding frame includes at least three seat surfaces and at least three adhesive reservoirs, and the seat surfaces and the adhesive reservoirs are disposed at positions different from each other in a circumferential direction of an optical axis of the lens.

5. A method of manufacturing a lens holding structure comprising the steps of:

preparing a lens, and a holding frame which has a seat surface and holds the lens;

bringing the lens into contact with the seat surface; and moving the lens translationally in a direction away from the seat surface.

6. The method of manufacturing the lens holding structure according to claim 5, wherein an inclination of a rotational axis in a yaw direction and an inclination of a rotational axis in a pitch direction of the lens are not substantially changed when the lens is moved translationally in the direction away from the seat surface.

\* \* \* \* \*